United States Patent [19]

Aimar

[11] 4,059,200

[45] Nov. 22, 1977

[54] PLASTIC FILLER CAP

[75] Inventor: Michele Aimar, Turin, Italy

[73] Assignee: ITW Fastex Italia, S.p.A., Turin, Italy

[21] Appl. No.: 739,227

[22] Filed: Nov. 5, 1976

[30] Foreign Application Priority Data

Nov. 10, 1975 Italy .................................. 29127/75

[51] Int. Cl.² ...................... B65D 53/00; B65D 51/16
[52] U.S. Cl. .................................... 220/233; 220/361; 220/367
[58] Field of Search ............... 220/233, 293, 298, 303, 220/361, 367, 373, 374; 215/329

[56] References Cited

U.S. PATENT DOCUMENTS

| 2,816,681 | 12/1957 | Taylor | 220/303 |
| 4,006,837 | 2/1977 | Gates et al. | 220/293 X |

Primary Examiner—William Price
Assistant Examiner—Steven M. Pollard
Attorney, Agent, or Firm—Jack R. Halvorsen; Robert W. Beart

[57] ABSTRACT

A filler cap is provided comprising a flange having a handgrip, a stem of square shape for engagement in a complimentary square shaped opening in the tank. The stem is comprised of two sections angularly offset relative to each other by 45° and connected by inclined surfaces. Once the first section of the stem is inserted into the tank opening it is sufficient to rotate the cap by ⅛ of a turn in order to lock it in a closed position.

4 Claims, 5 Drawing Figures

PLASTIC FILLER CAP

The present invention relates to caps, particularly for use in gasoline tanks of motorcycles, mopeds and the like.

At present the caps of this type are generally made of metal material and are applied to the associated tank by a bayonet joint or by screwing. These filler caps are formed of several pieces and therefore are rather sophisticated and, accordingly, very expensive.

The object of this invention is to provide a filler cap of the above type, which is less expensive than the known filler caps.

More particularly the filler cap according to this invention is made of plastic material and is characterized in that it comprises a flange provided at the periphery thereof with a seal and at the center with an operating handgrip, and a hollow stem of a square shape in cross-section, intended to engage a tank opening of corresponding shape in cross-section, said stem being formed of a pair of substantially co-axial squared sections angularly offset relative to each other by 45° and connected to each other by inclined walls so that by introducing in the tank opening the first section of said stem and rotating by means of said handgrip the filler cap by ⅛ of a turn, the edges of said said first stem section deflect and the filler cap, by sliding said inclined walls connecting said pair of sections over the inner edges of said tank opening, locks in the position where the second stem section engages into the opening and said first stem section projects from said tank opening to the inner portion of the tank.

The invention will be better understood from the following description, given merely by way of example and therefore not limitative, of an embodiment thereof in connection with the accompanying drawings, wherein.

Figure 2:
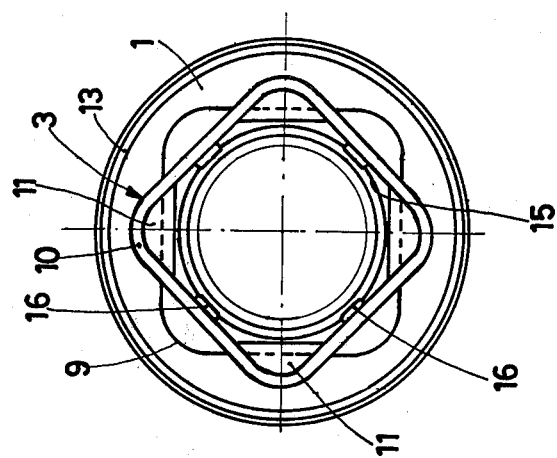
FIG. 2 shows the filler cap of FIG. 1 in a plan view, looking from the opposite side with respect to FIG. 1.
Figure 1:
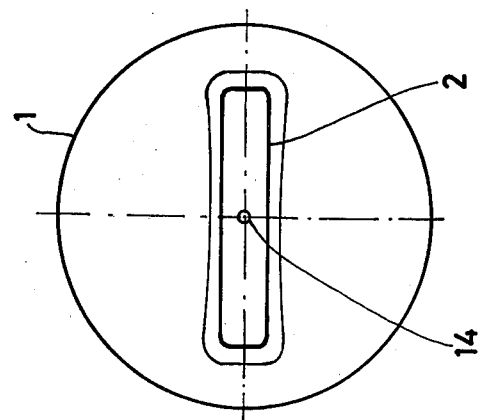
FIG. 1 shows a filler cap according to the invention in a plan view, looking from the handgrip side.

Referring first to FIGS. 1 and 2 there is shown a filler cap according to this invention as comprising a flange 1 from a side of which a handgrip and from the opposite side of which a hollow stem project, the latter being designated generally with the reference numeral 3.

Figure 3:
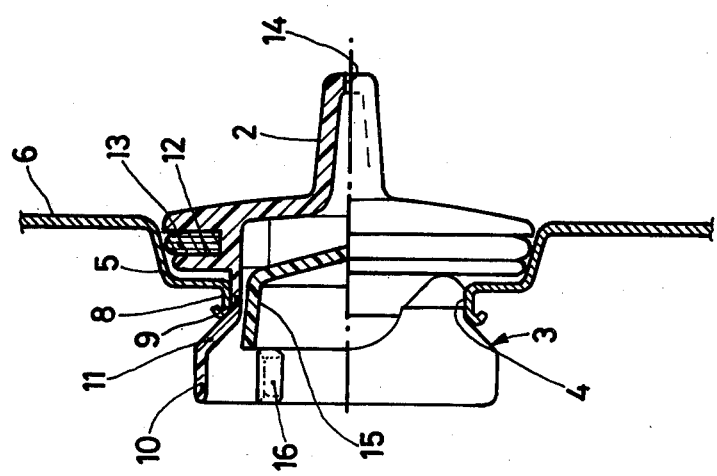
FIG. 3 shows in the upper half an axial section and in the lower half a side view of the filler cap of FIGS. 1 and 2, with the cap applied to a tank illustrated in a fragmentary view.

In order to better understand the cap structure reference may be had also to FIG. 3 which shows the filler cap applied to an opening obtained by punching a drawn-down portion 5 provided in the wall 6 of a fuel tank.

Figure 5:
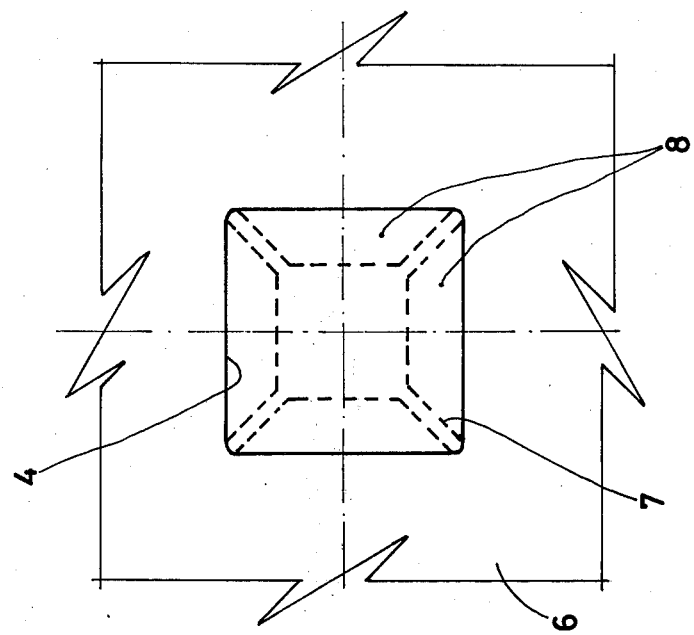
FIG. 5 is a diagrammatic view illustrating the manner of providing an opening like that of FIG. 4.
Figure 4:
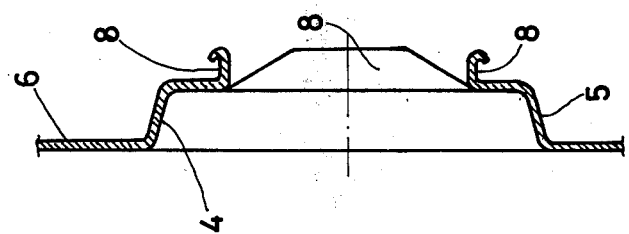
FIG. 4 is an axial sectional view of the tank opening intended to receive the filler cap of FIGS. 1 to 3.

In FIG. 4 the tank opening before the application of the filler cap is shown. In order to better understand the exact conformation of the wall defining the opening 4 it is advisable to briefly describe the way of obtaining this opening. In the tank wall 6 in which the drawn-down portion 5 has been first obtained there is punched by means of a punching tool having the shape shown by the dashed line 7 in FIG. 5, an opening having the same shape as the punching tool and the resulting four tabs 8 are then turned substantially at right angles to the tank wall so as to obtain a square opening 4 defined by the four tabs 8.

Returning now to the cap structure in connection with FIGS. 1 to 3, it is seen that the hollow stem 3 comprises a pair of sections 9 and 10, both of square shape in cross-section, but with one section angularly offset by 45° with respect to the other section, the two sections being connected to each other by inclined walls 11.

The flange 1 is provided at its periphery with a groove 12 in which a gasket 13 is inserted, said gasket 13 being intended to form a sealing, when the cap is inserted into the opening, against the wall 5 of the drawn portion in the tank.

On the head portion of the handgrip 2 a vent-hole 14 is provided. Inside the cap a cup-shaped countercap 15 is provided, which is inserted by snap action and kept in place along the edge thereof by means of four teeth 16 provided on the inner wall of portion 10 of the stem 3. The function of the countercap 15 is to avoid a direct connection between the vent-hole 14 and the inside of the tank.

The described filler cap is applied to the tank in the following manner:

The portion 10 of the stem 3 is first inserted into the square opening 4 and then the cap is rotated by ⅛ of tour by means of the handgrip 2. During this rotation the corners of the stem portion 10, because of the flexibility of the material of which it is made, are squeezed together and the cap begins to slide with the inclined surfaces 11 connecting the stem portions 9 and 10 on the walls 8 of the opening 4 until the stem portion 10 is inside the tank in the position shown in FIG. 3. At this time, the stem portion 9 lies at the opening walls 8 and, because this portion 9 has the same square shape as that of the opening 4 defined by the walls 8, it locks in place the cap and prevents any further rotation of the cap exceeding ⅛ of tour. In this position of the cap the gasket 13 is pressed against the wall 5 of the drawn portion 5 of the tank thereby assuring a good sealing action.

While an embodiment only of the invention has been described and illustrated, it is apparent that various changes and modifications can be made thereto without departing from the invention.

Likewise, although the cap has been described and illustrated in the specific application to a gasoline tank, it could be also used in other fields, such as for washing machine filters, dish washing machines and other electrical appliances.

What I claim is:

1. A plastic filler cap for tanks characterized in that the tank filler cap comprises a flange provided at the periphery thereof with a seal and at the center with an operating handgrip, and a hollow stem of a square shape in cross-section intended to engage a tank opening of corresponding shape in cross-section, said stem being formed of a pair of substantially co-axial squared sections angularly offset relative to each other by 45° and connected to each other by inclined walls so that by introducing the first section of said stem in the tank opening and rotating said cap by means of said handgrip for ⅛ of a turn, the edges of said first stem section will deflect and by sliding said inclined walls connecting said pair of sections on the inner edges of said tank opening, said filler cap locks in the closed position when the second stem section engages in the opening and said first stem section projects from said opening to the inner portion of said tank.

2. A plastic filler cap according to claim 1, characterized in that the handgrip is hollow and is provided with a venthole.

3. A plastic filler cap according to claim 2, characterized in that it bears at the inner side thereof a cupshaped countercap inserted by snap action and retained in position along the edge there of by serrations provided on the inner wall of said first stem section.

4. A plastic filler cap according to claim 1, characterized in said flange being provided with a peripheral groove, a gasketseated in said groove and adapted to seal against a complimentary surface of said tank.

* * * * *